(12) United States Patent
Daschner et al.

(10) Patent No.: US 6,330,118 B1
(45) Date of Patent: Dec. 11, 2001

(54) DUAL FOCUS LENS WITH EXTENDED DEPTH OF FOCUS

(75) Inventors: Walter Daschner, Half Moon Bay; Barry Block, Los Altos; Arnold Thornton, San Jose, all of CA (US); Bernard Kress, Neubourg (FR)

(73) Assignee: Aerial Imaging Corporation, Milpitas, CA (US)

( * ) Notice: Subject to any disclaimer, the term of this patent is extended or adjusted under 35 U.S.C. 154(b) by 0 days.

(21) Appl. No.: 09/288,269

(22) Filed: Apr. 8, 1999

(51) Int. Cl.[7] ............................... G02B 3/10; G02B 3/08; G02B 27/44
(52) U.S. Cl. .................. 359/721; 359/742; 359/565; 369/112
(58) Field of Search ................... 359/721, 742, 359/743, 565; 369/112

(56) References Cited

U.S. PATENT DOCUMENTS

| | | | |
|---|---|---|---|
| 3,586,412 | 6/1971 | Leith | 350/3.5 |
| 5,122,903 | 6/1992 | Aoyama et al. | 359/565 |
| 5,225,858 | * 7/1993 | Portney | 351/161 |
| 5,315,095 | 5/1994 | Marom et al. | 235/462 |
| 5,351,230 | * 9/1994 | Takeda et al. | 369/112 |
| 5,446,565 | 8/1995 | Komma et al. | 359/19 |
| 5,561,558 | 10/1996 | Shiono et al. | 359/569 |
| 5,648,951 | * 7/1997 | Kato et al. | 369/112 |

FOREIGN PATENT DOCUMENTS

| | | |
|---|---|---|
| 0 871 163 | 10/1998 | (EP) |
| 59-105605 | 6/1984 | (JP) |

OTHER PUBLICATIONS

Sochacki, et al., "Nonparaxial Design of Generalized Axicons", Applied Optics, vol. 31, No. 25, Sep. 1, 1992, pp. 5326–5330.

Leseberg, "Computer Generated Holograms: Cylindrical, Conical, and Helical Waves", Applied Optics, vol. 26, No. 20, Oct. 15, 1987, pp. 4385–4390.

Frere, et al., "Computer Generated Holograms of Three–Dimensional Objects Composed of Line Segments", J. Opt. Soc. Am., vol. 3, No. 5, May 1986, pp. 726–730.

McCleod, "Axicons and Their Uses", J. Opt. Soc. Am., vol. 50, No. 2, Feb. 1960, pp. 166–169.

Dong, et al., "Iterative Optimization Approach for Designing an Axicon With Long Focal Depth and High Transverse Resolution", J. Opt. Soc. Am., vol. 13, No. 1, Jan. 1996, pp. 97–103.

* cited by examiner

Primary Examiner—Scott J. Sugarman

(57) ABSTRACT

A magneto optic or optical disk drive comprises a laser source for providing laser beam, and a lens or compound lens for focussing the laser onto a currently inserted recording disk with specific overcoat thickness. In one embodiment, the lens is a compound lens that can focus aberration-free spots on different types of disk media having recording layers located under overcoats of different thicknesses. When a specific disk is inserted, only one spot in focussed onto the current recording layer. Furthermore, if the disk spins rapidly, it can wobble. The lens or compound lens comprises different regions where the focal length may vary slightly and continuously or discretely. Because of this, as the disk wobbles, the lens can nonetheless continue to focus laser light onto a small spot on the recording media, providing increased depth of focus in the vicinity of the currently inserted recording media. Furthermore, the increased depth of focus will also remedy problems related to the change in focal length of the lens with changes in wavelength of the laser source. Because some of these changes in wavelength occur abruptly, this is also a case in which the limited performance of the auto-focus tracking system would be overly burdened.

49 Claims, 14 Drawing Sheets

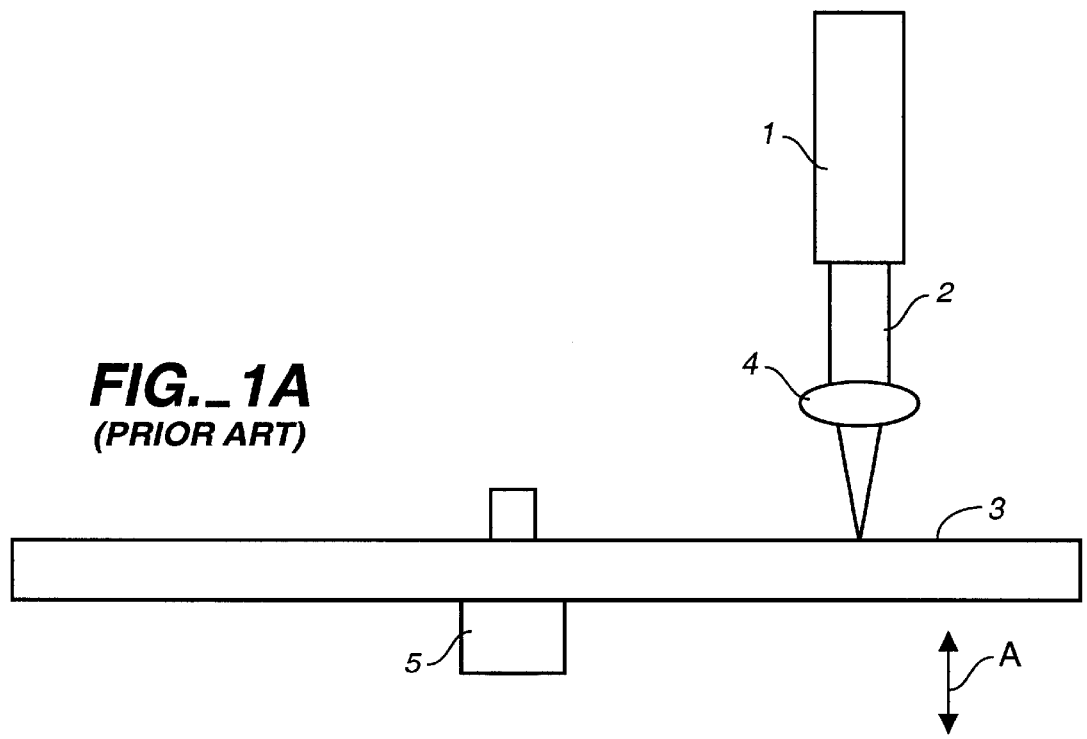
FIG._1A
(PRIOR ART)
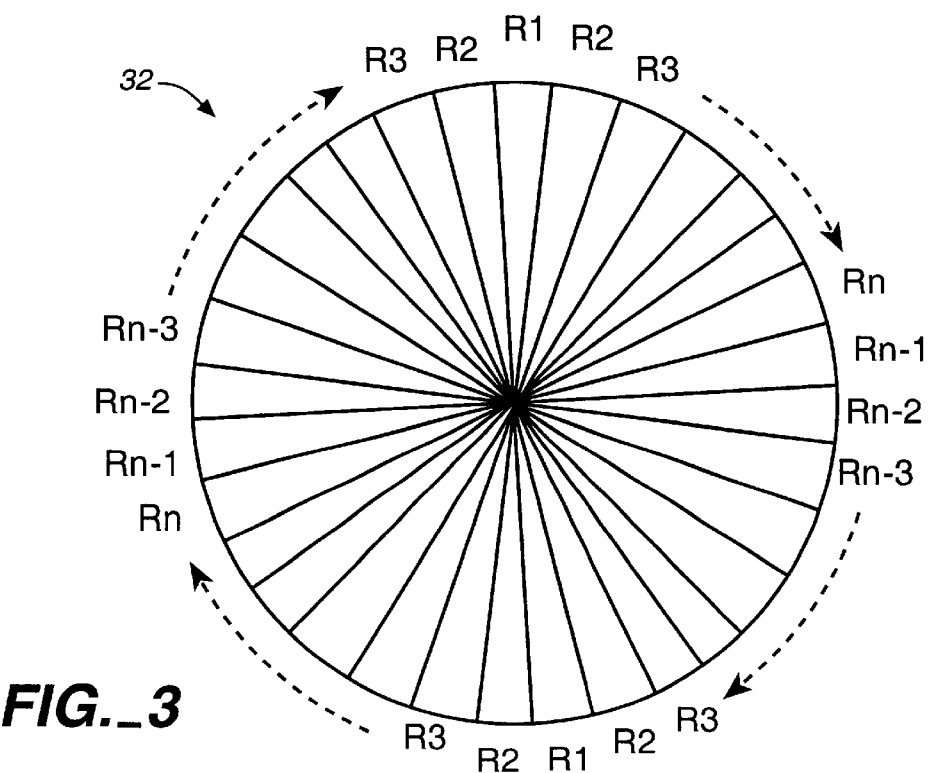
FIG._3

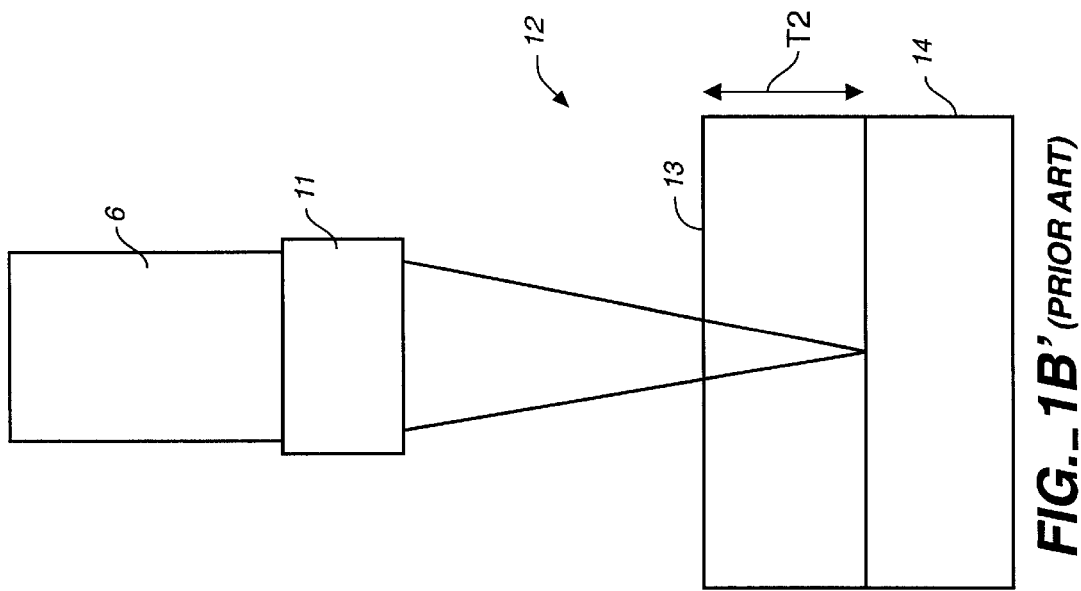
FIG._1B' (PRIOR ART)
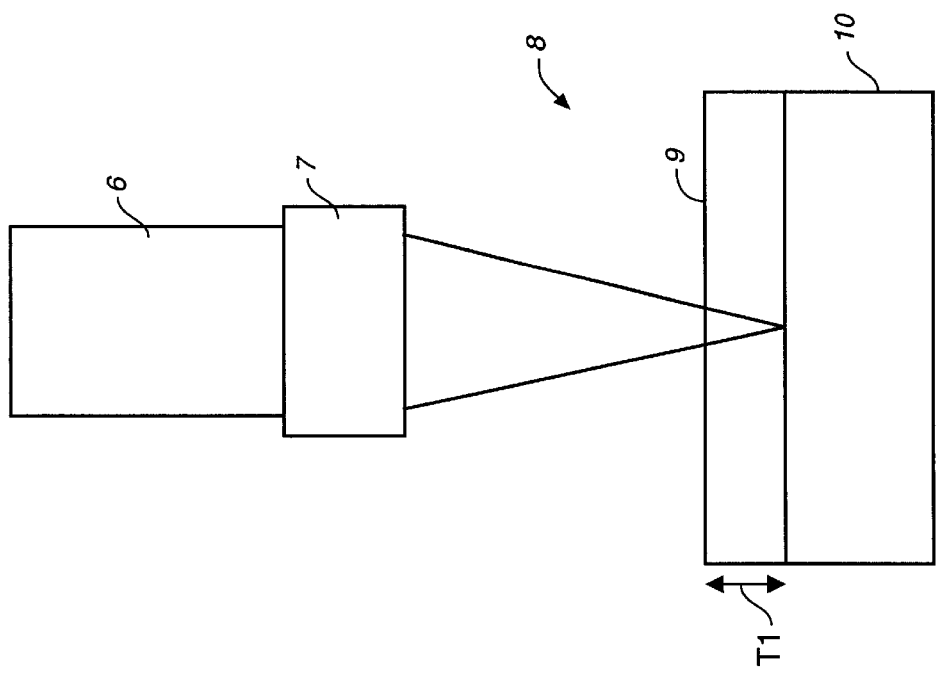
FIG._1B (PRIOR ART)

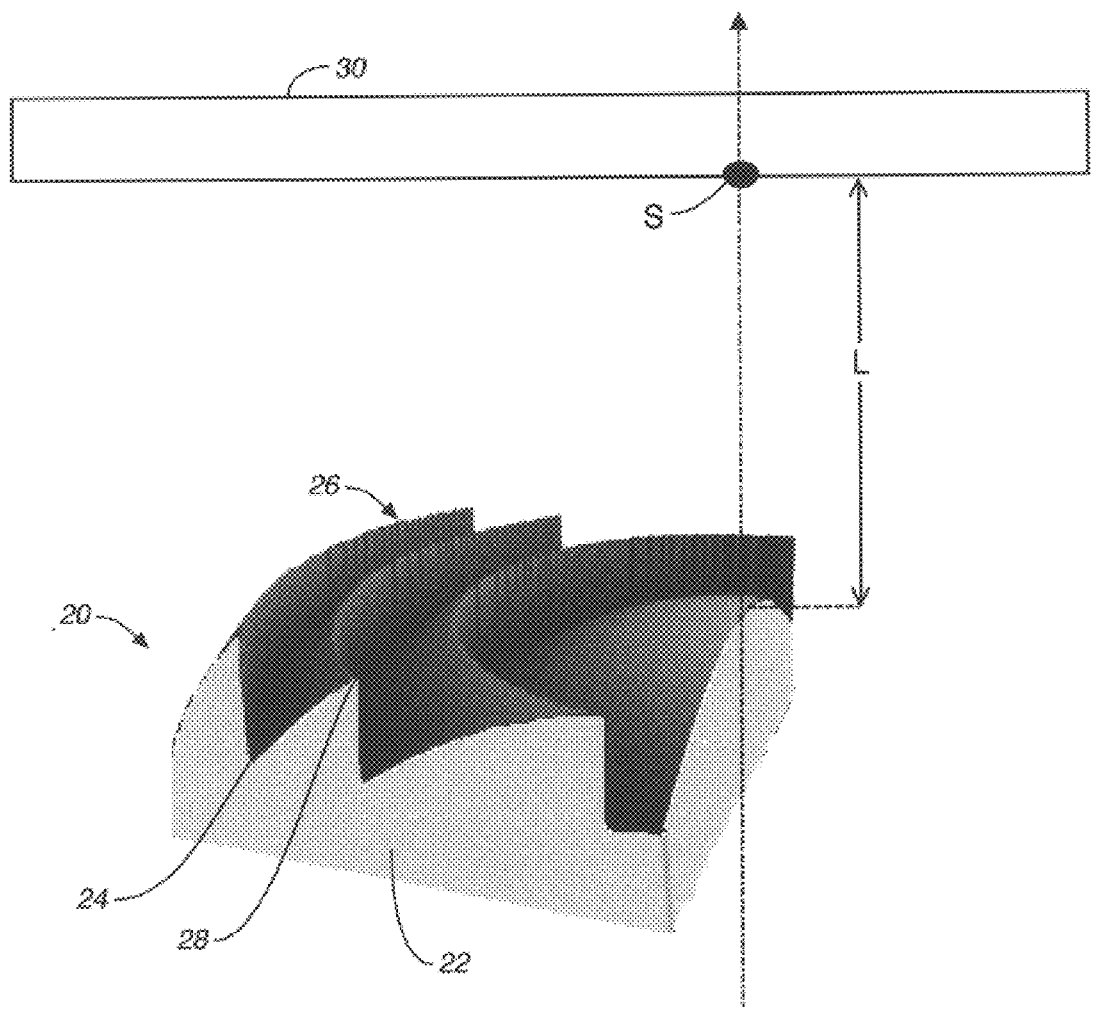
FIG._2

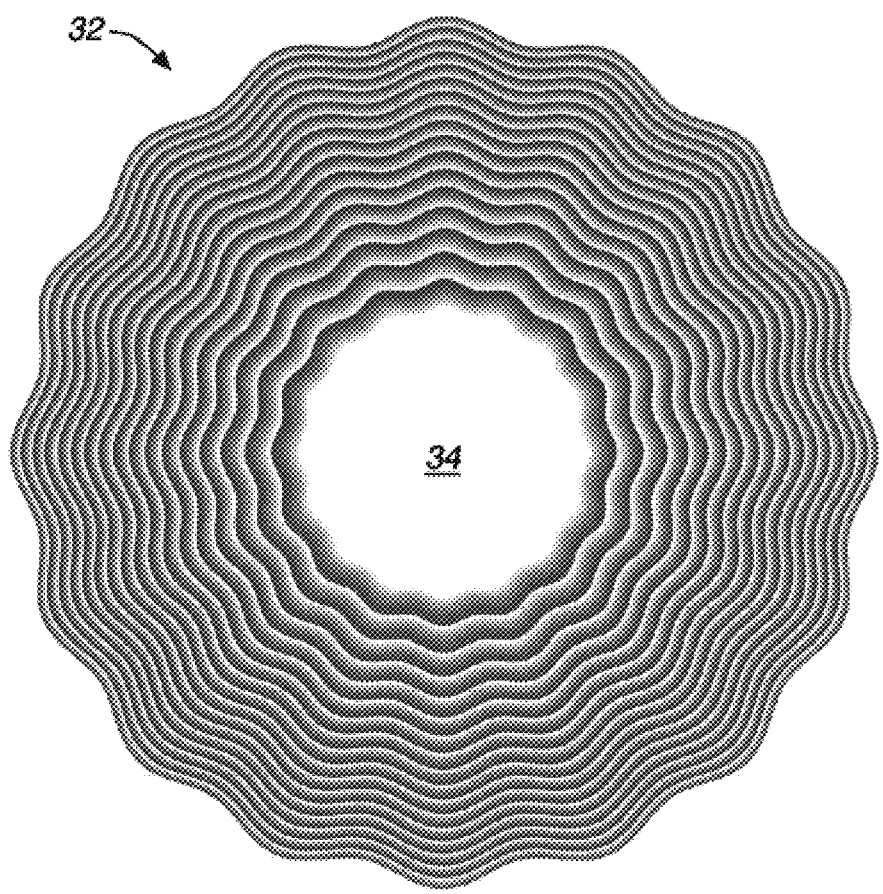
FIG._4
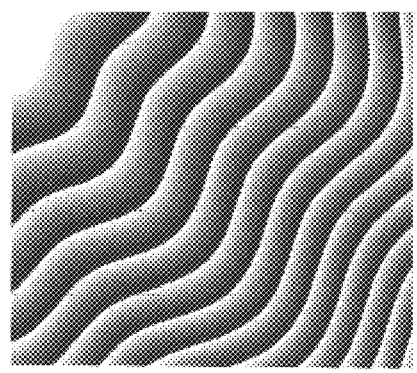
FIG._4A

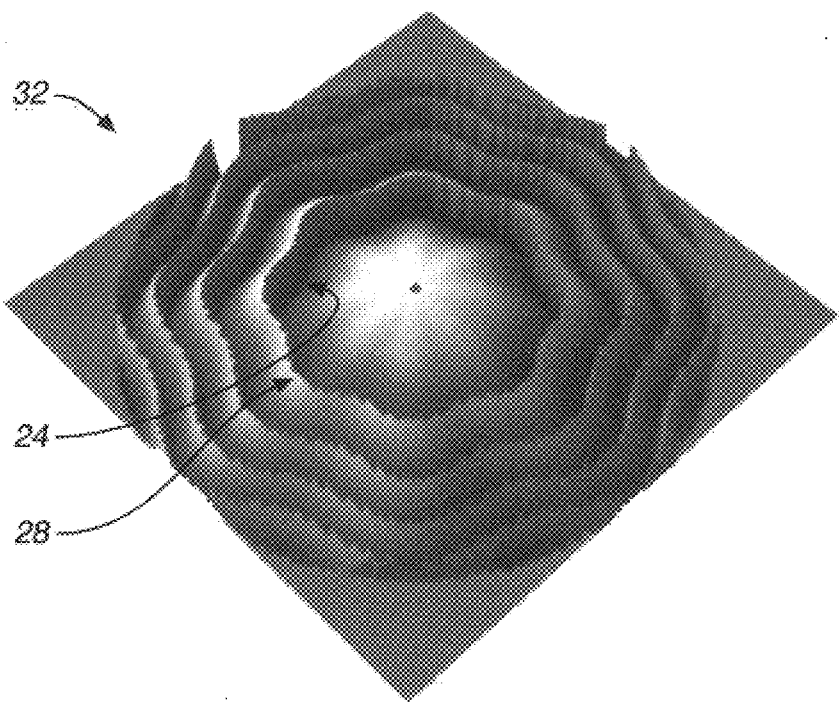
FIG._5A
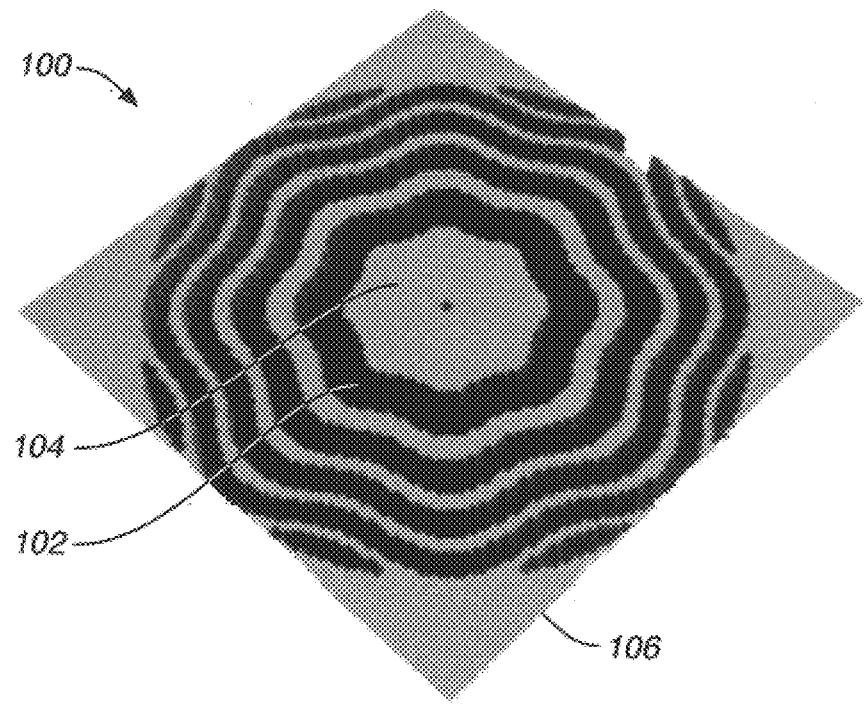
FIG._5B

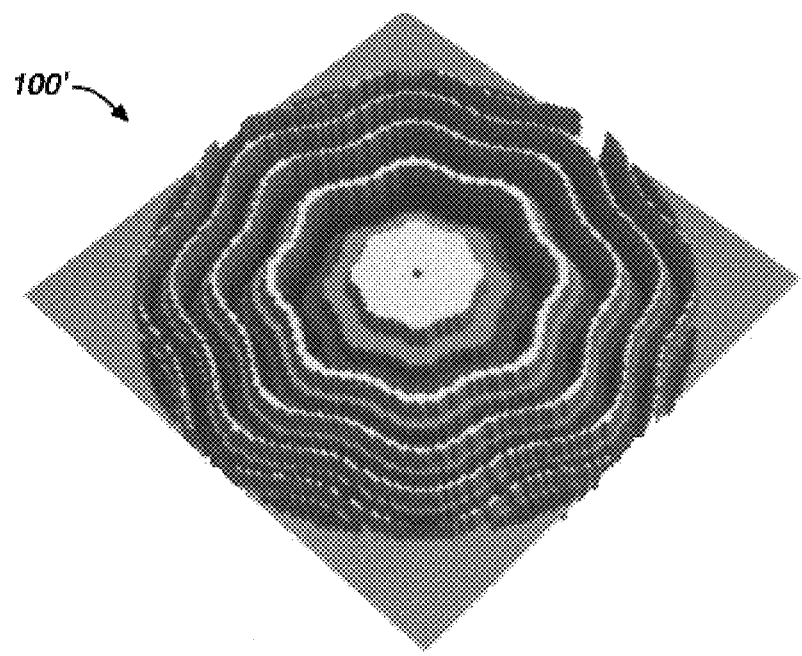
FIG._5C
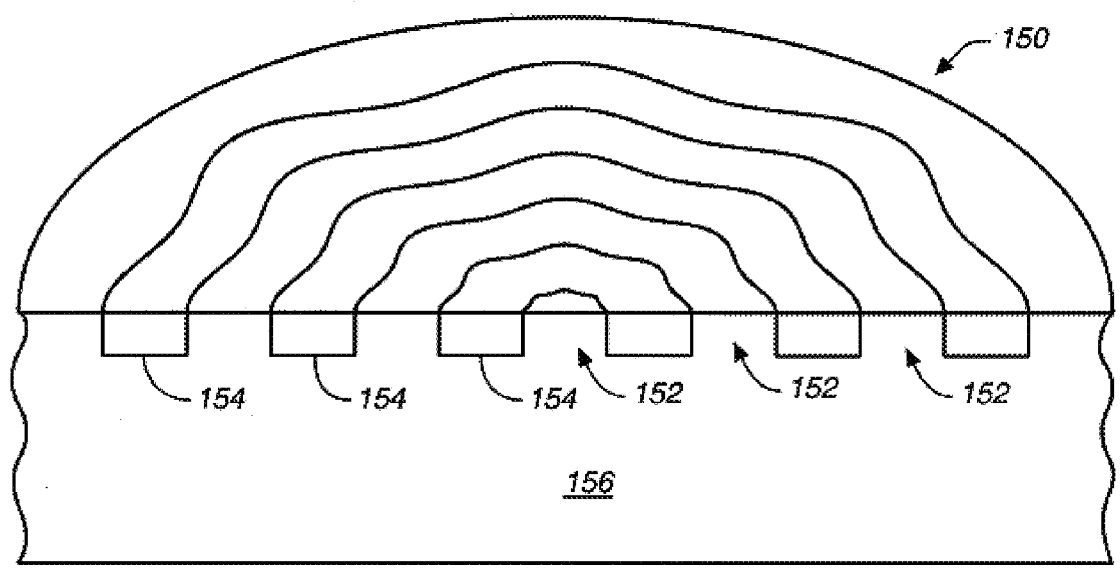
FIG._6

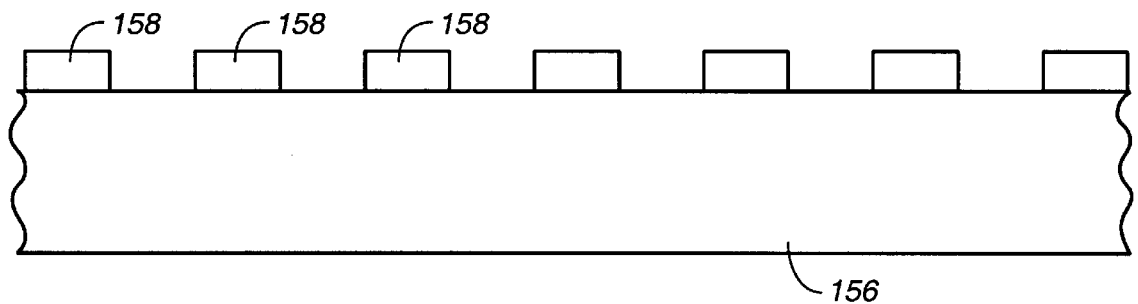
FIG._7A
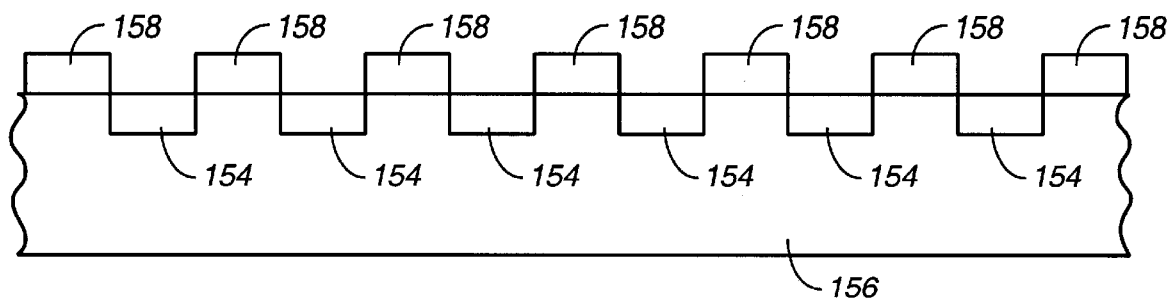
FIG._7B
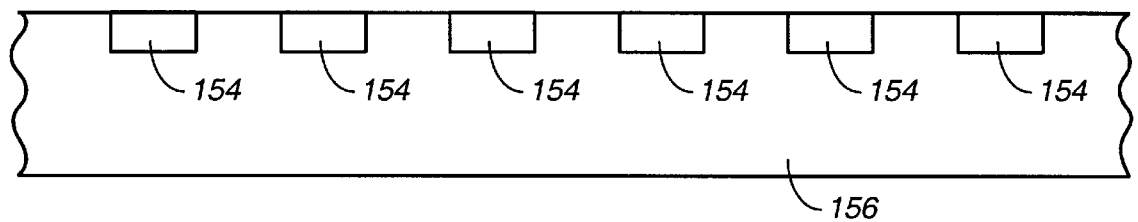
FIG._7C

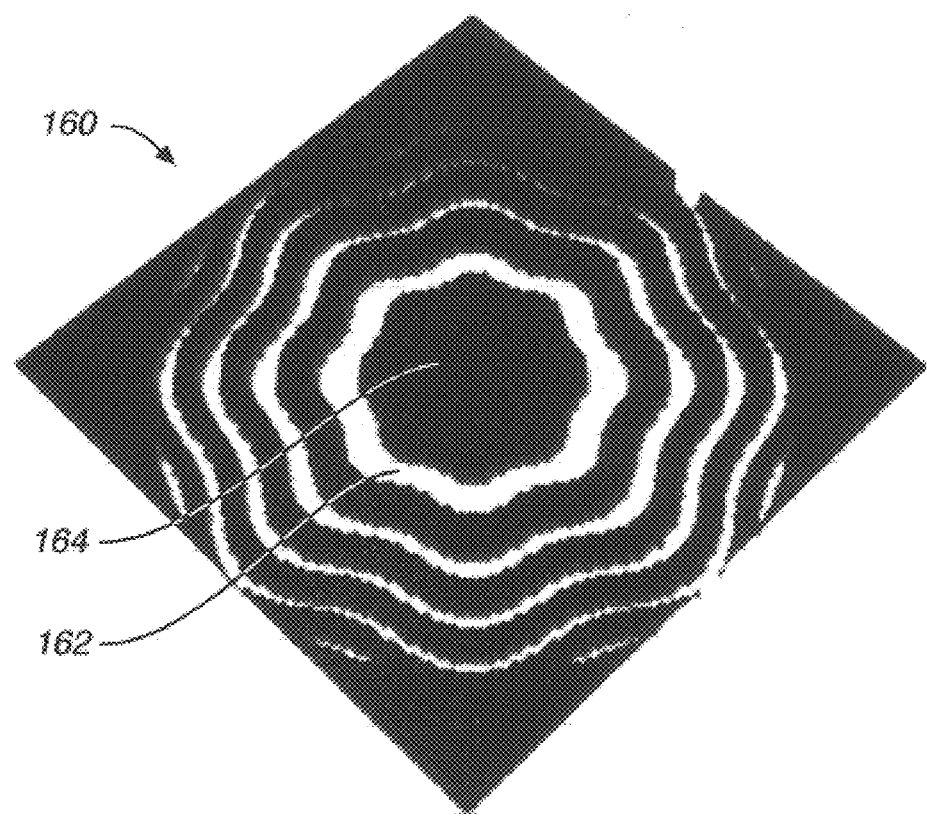
FIG._8A
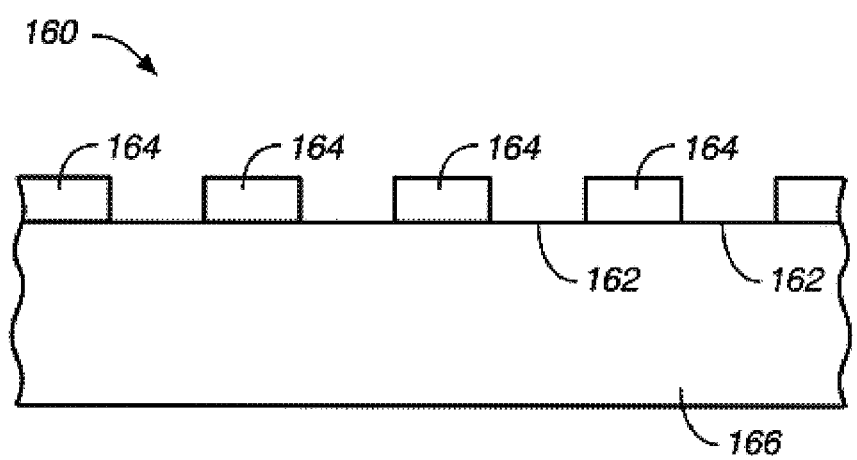
FIG._8B

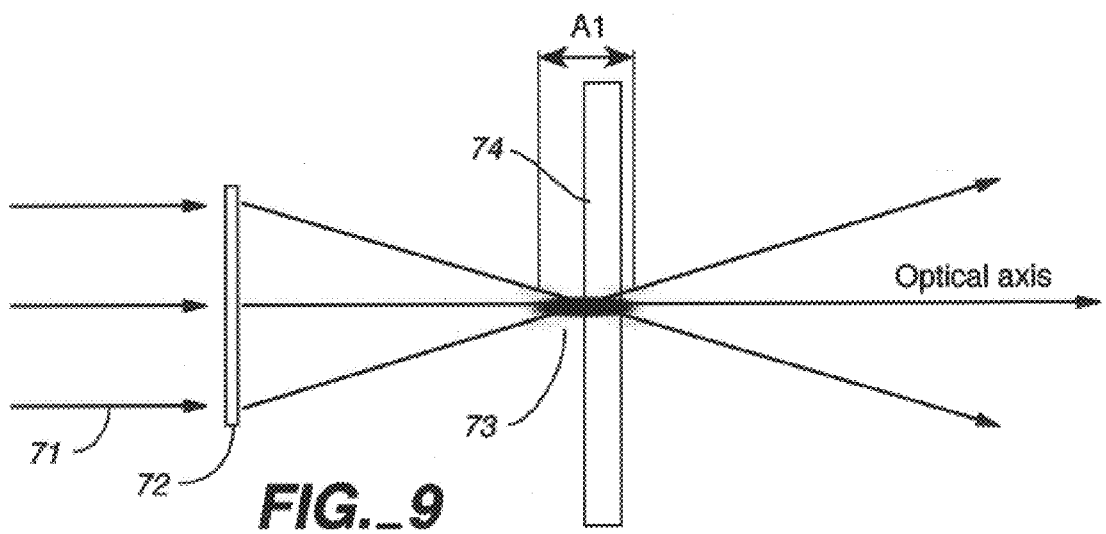
FIG._9
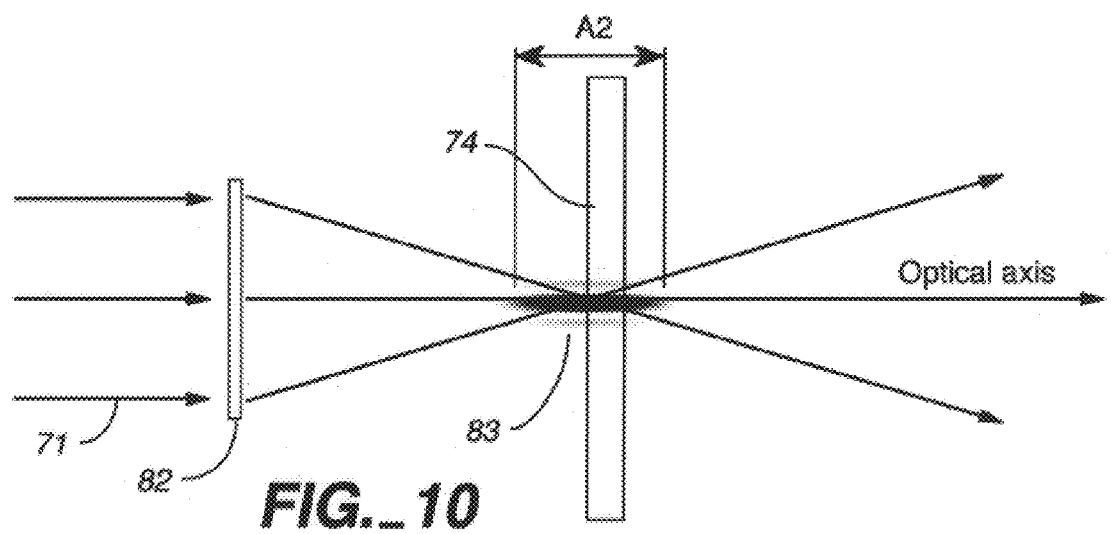
FIG._10
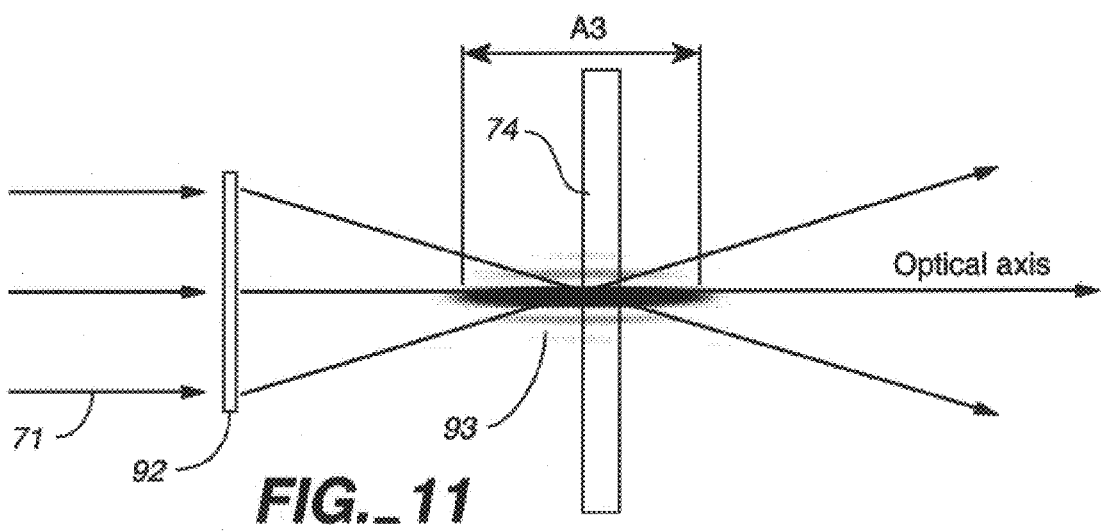
FIG._11

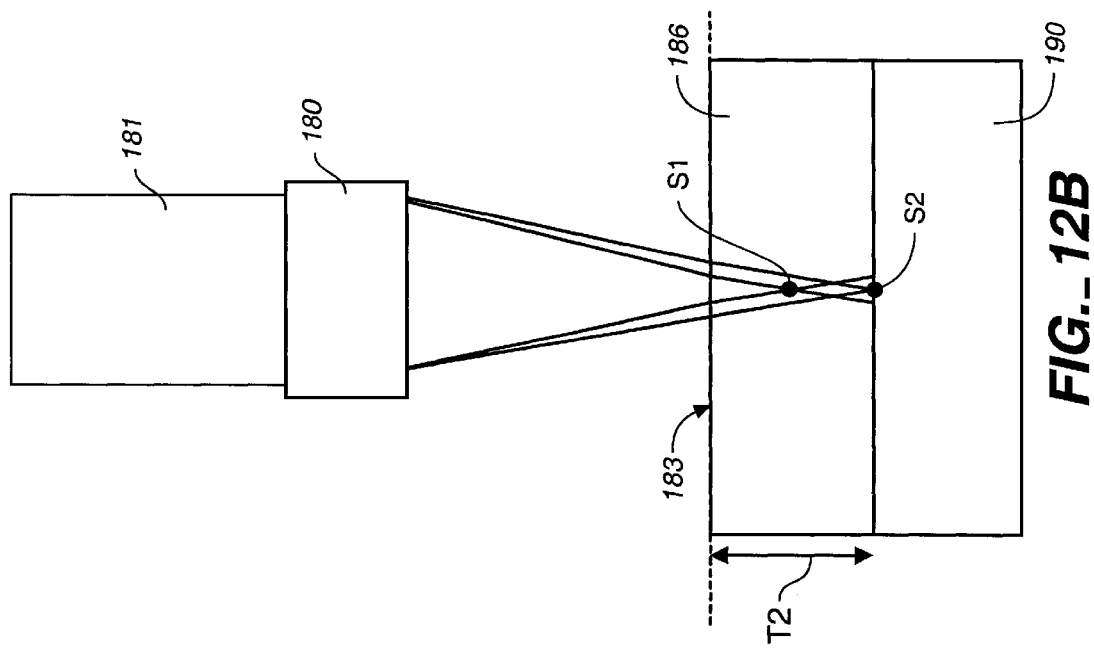
*FIG._12B*
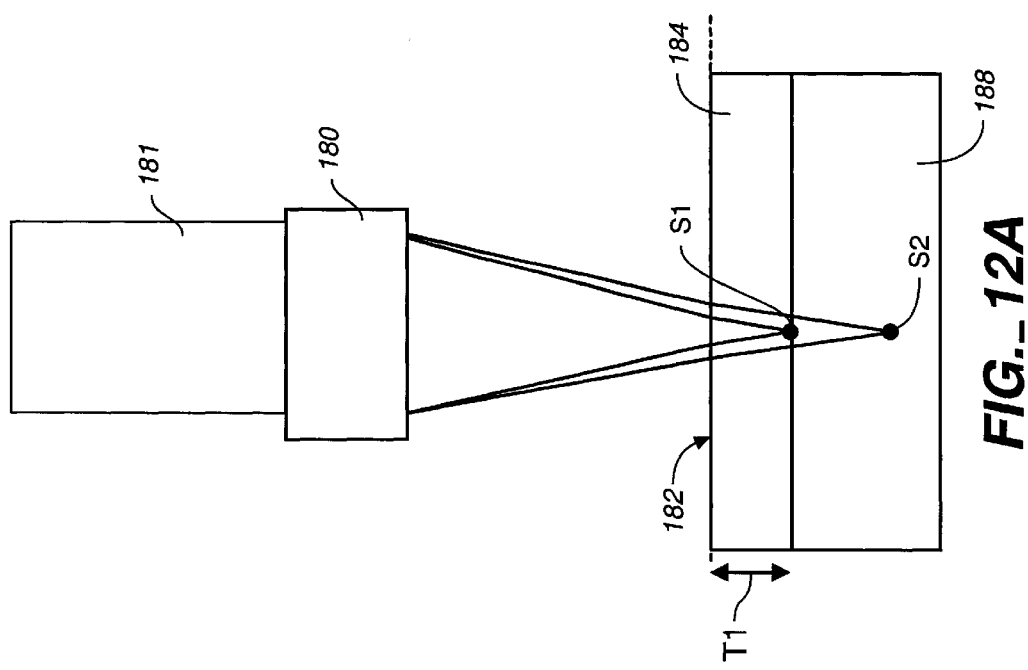
*FIG._12A*

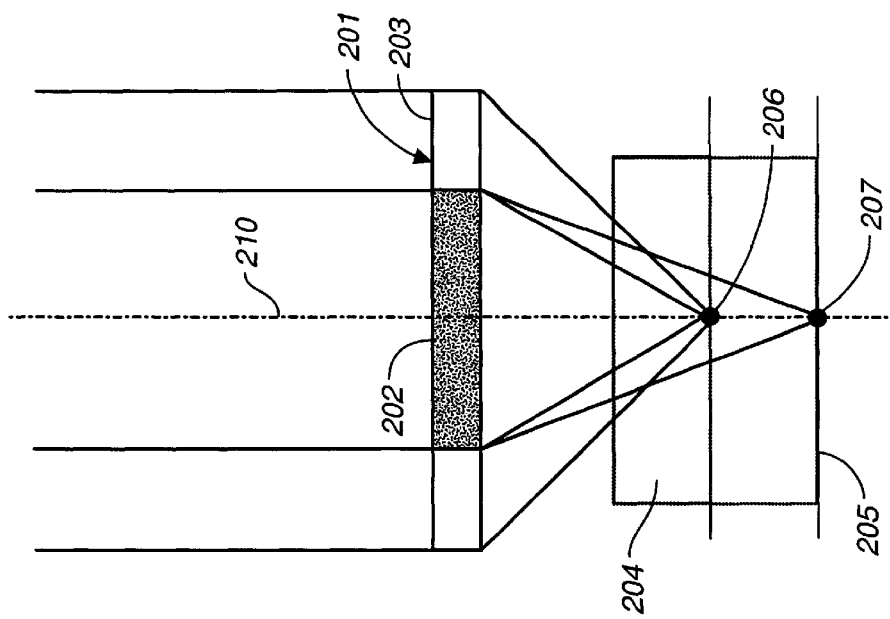
FIG._13B
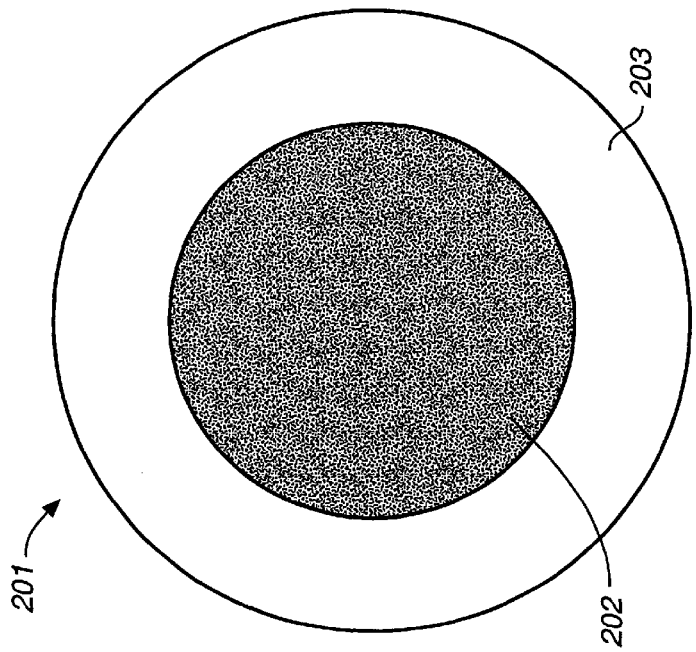
FIG._13A

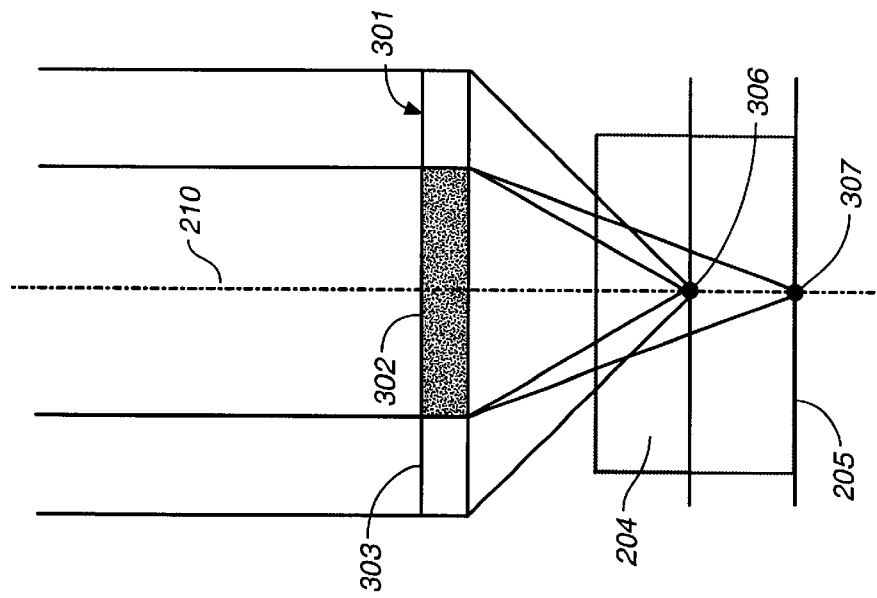
FIG._14B
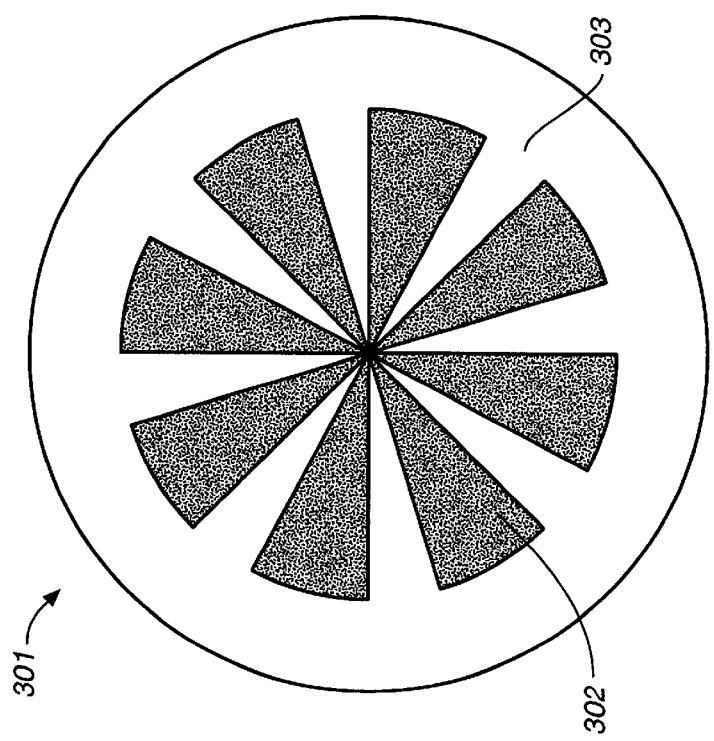
FIG._14A

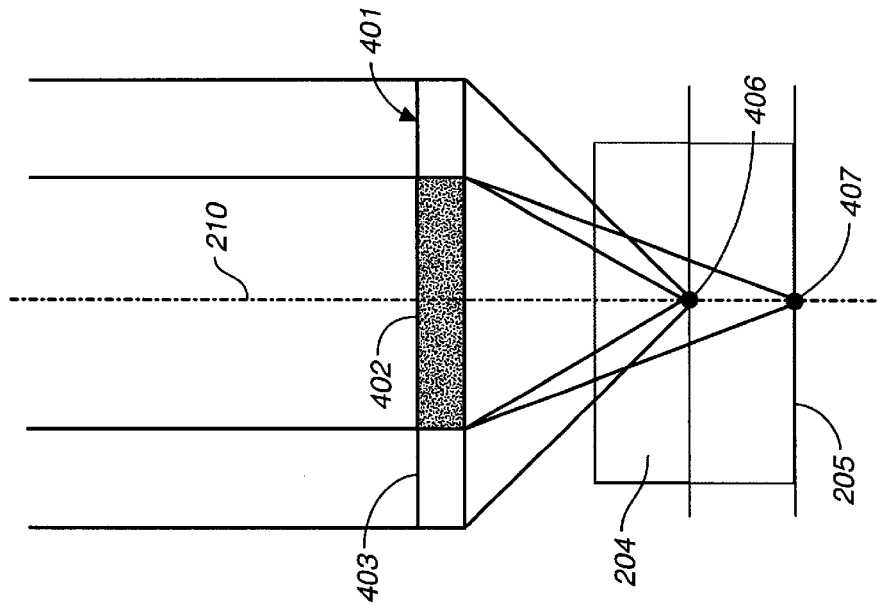
FIG._15B
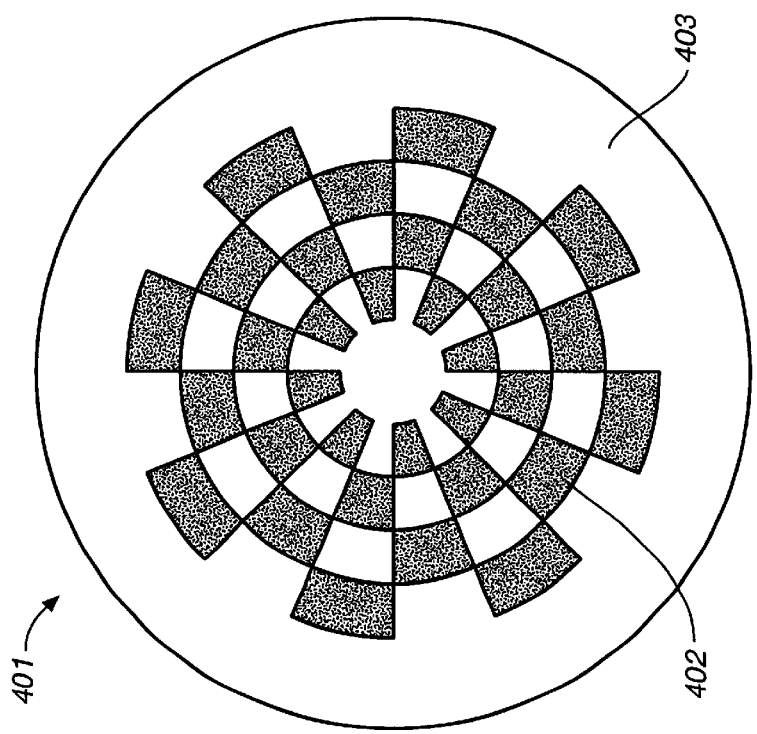
FIG._15A

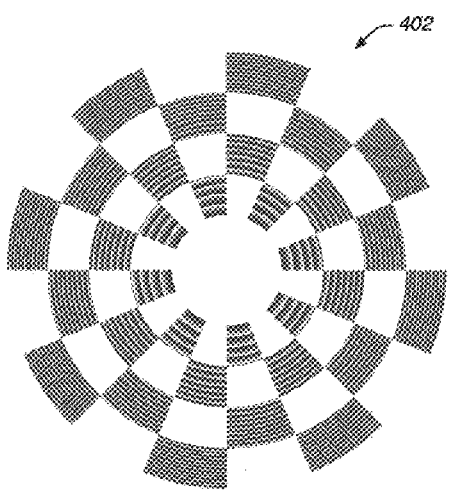
FIG._16A
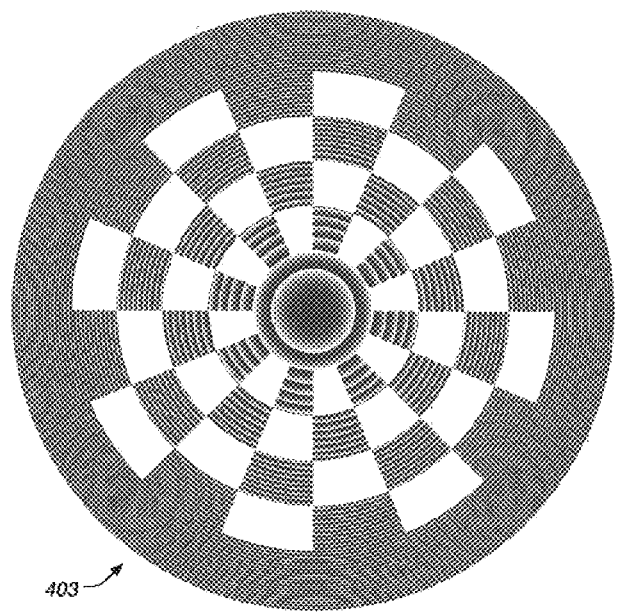
FIG._16B

DUAL FOCUS LENS WITH EXTENDED DEPTH OF FOCUS

BACKGROUND OF THE INVENTION

This invention pertains to lenses. In particular, this invention pertains to lenses that can be used to focus a laser beam on a small spot, or on two spatially separated small spots, but simultaneously provide large depth of focus. Such a lens is particularly useful in optical and magneto-optical disk drives, and drives that read and write to different disks with different overcoat thicknesses.

Referring to FIG. 1A, a prior art optical or magneto-optic disk drive typically comprises a laser source 1 for providing a laser beam 2, an optical or magneto-optic data recording disk 3, and a lens 4 for focussing the laser on a small spot on disk 3. A motor 5 rotates disk 3 so that laser beam 2 can scan over a data recording track of the disk. In such applications, the depth of focus is an important parameter which is preferably maximized. In conventionally designed optics, the depth of focus D is given by the following relationship:

$$D=0.8\lambda/(NA)^2$$

where NA is the numerical aperture of the lens and $\lambda$ is the laser light wavelength.

In optical and magneto-optic data storage, one also generally strives for high data recording density. This means that the spot size produced by the focussing lens should be as small as possible. To reduce the spot size of a given design, one increases the NA of the lens. However, as can be seen from the above equation, this has the detrimental effect of reducing the depth of focus D. This detrimental effect is especially important in the case of drives in which the disk spins rapidly, e.g. 40× drives. (The nomenclature "40×" is part of a numbering system which is well known in optical storage and refers to a rotation rate 40 times that of standard audio CD players. An audio CD player spins at 1×.) Because disk 3 spins rapidly, it can sometimes wobble, e.g. moving in the direction of arrow A, causing disk 3 to move closer to or further from lens 4, and causing the laser spot to be out of focus. In such drives, a shallow depth of focus puts an unmanageable burden on the frequency response of the auto-focus system of the drive. Accordingly, it would be desirable to provide a lens with a relatively large depth of focus and a small spot size.

There are several types of optical and magneto-optic media known in the art. FIG. 1B shows a prior art laser beam 6 passing through a lens 7 to read data from a DVD disk 8. DVD disk 8 comprises a transparent substrate 9 over a recording layer 10. Typical transparent substrates 9 on DVD recording media have a thickness T1 of about 600 microns.

FIG. 1B' shows laser beam 6 passing through a lens 11 to read data from a CD disk 12. CD disk 12 comprises a transparent substrate 13 over a recording layer 14. Typical transparent substrates 13 on a CD disk have a thickness T2 of about 1200 microns. Thus, in order to read both CD disks and DVD disks, an optical disk drive must have two lenses—one for reading CD media and one for reading DVD media. Such drives typically include a mechanism for switching lenses. Such a mechanism is cumbersome and adds expense to the disk drive. Further, it is difficult to substitute one lens for the other while continuing to maintain precise spacing between the lens and the media. Accordingly, it would be desirable to provide a lens capable of reading data from (or writing data to) different types of recording media having different substrate thicknesses.

SUMMARY

A lens in accordance with the invention comprises regions having at least two different optical phase functions implementing two different focal lengths, which are spatially multiplexed over the lens aperture. The lens is used to produce from a single incoming laser beam at least two converging beams, but produce only one extended depth of focus spot on a currently inserted rotating data recording disk, for a given overcoat thickness. Thus, even if the disk wobbles, and moves closer to or further from the lens, the lens will continue to focus one aberration-free small spot onto the recording layer of the current disk inserted in the drive.

In one embodiment, a lens in accordance with our invention accommodates types of recording media having transparent substrates thereon of different thicknesses. For example, in one embodiment, the lens has a first region having a first focal length for accommodating recording media having a transparent substrate of a first thickness. The lens also has at least a second region having a second focal length for accommodating recording media having a transparent substrate of a second thickness. Thus, one can use one lens to read data from (or write data to) different types of recording media.

BRIEF DESCRIPTION OF THE FIGURES

FIG. 1A shows a lens focussing a laser beam on a recording medium in accordance with the prior art.

FIGS. 1B and 1B' show a lens focussing a laser beam on two different types of optical recording media having different transparent overcoat thicknesses.

FIG. 2 illustrates a blazed diffractive lens constructed in accordance with the teachings of PCT Patent Application WO 98/52101.

FIG. 3 schematically illustrates in plan view a lens constructed in accordance with a first embodiment of our invention having different regions of various focal lengths. FIG. 3 shows how these regions can be arranged within the lens aperture.

FIG. 4 illustrates in plan view a blazed lens constructed in accordance with the first embodiment of our invention, comprising a centrally obscured area and 16 circumferential periods of a continuously varying focal length.

FIG. 4A is a magnified view of fringes within the lens of FIG. 4.

FIG. 5A is a perspective view of the lens of FIG. 4.

FIG. 5B shows a binary (two phase levels) phase lens constructed in accordance with another embodiment of our invention.

FIG. 5C shows a four phase level lens constructed in accordance with another embodiment of our invention.

FIG. 6 shows a lens constructed in accordance with another embodiment of our invention in which portions of a transparent substrate are doped to locally alter the refractive index of the doped portions.

FIGS. 7A to 7C illustrate in cross section the lens of FIG. 6 during manufacturing.

FIGS. 8A and 8B shows a binary amplitude lens constructed in accordance with another embodiment of our invention.

FIG. 9 shows a numerically reconstructed intensity pattern along the optical axis for a blazed Fresnel zone plate lens.

FIG. 10 shows a numerically reconstructed intensity pattern along the optical axis for a blazed lens constructed in accordance with the teachings of PCT Patent Application WO 98/52101.

FIG. 11 shows a numerically reconstructed intensity pattern along the optical axis for a blazed lens constructed in accordance with the first embodiment of our invention.

FIGS. 12A and 12B show how a single lens constructed in accordance with the invention can be used in conjunction with two different types of media having two different protective overcoat thicknesses.

FIGS. 13A and 13B schematically show in plan view and side view, respectively, a doughnut spatial multiplexing geometry for implementing a compound lens that focuses two aberration-free spots.

FIGS. 14A and 14B schematically show in plan view and side view, respectively, a pie chart multiplexing geometry for implementing a compound lens that focuses two aberration-free spots without side lobes.

FIGS. 15A and 15B schematically show in plan view and side view, respectively, a dartboard multiplexing geometry for implementing a compound lens that focuses two aberration-free spots without side lobes and with a high Strehl ratio.

FIG. 16A shows a low NA lens and FIG. 16B shows a high NA lens within the dartboard multiplexing geometry lens schematically shown in FIGS. 15A and 15B.

DETAILED DESCRIPTION

A lens constructed in accordance with the invention comprises regions of different focal lengths. In one embodiment, the lens includes abrupt changes in focal length between the regions. In another embodiment, the focal length changes smoothly and slowly from one region to the next. The lens can be constructed using a number of techniques. In one embodiment, the manufacturing steps for constructing the lens can be as described in PCT Patent Application WO 98/52101, incorporated herein by reference. The lens can also be constructed using the manufacturing steps described in U.S. patent application Ser. No. 08/833,608, entitled "Optical Head with a Diffractive Lens", or U.S. patent application Ser. No. 09/059,778, entitled "Method for Making an Optical or Magneto-Optic Head and the Resulting Head". The '608 and '778 Applications are incorporated herein by reference.

FIG. 2 illustrates a diffractive lens 20 constructed in accordance with the above-mentioned PCT Patent Application WO 98/52101. This lens comprises a structure known as a blazed zone plate. In particular, lens 20 comprises a transparent substrate 22. Etched into substrate 22 is a set of grooves 24. The upper surface 26 of substrate 22 thus contains grooves 24 and a set of ridges 28 that diffract light and cause this structure to serve as a diffractive focussing lens. Lens 20 exhibits a focal length L. Thus, lens 20 causes laser light striking the lens to be focussed onto a small spot S at length L from lens 20. Length L depends upon the spacing of grooves 24 and ridges 28. If lens 20 is used in conjunction with recording media such as media 30, and media 30 wobbles due to high rotational velocity, media 30 will occasionally move away from spot S.

FIG. 3 schematically illustrates in plan view a modified lens 32 in accordance with our invention, comprising regions R1 through Rn. Of importance, the ridges and grooves are spaced in region R1 so that region R1 of lens 32 exhibits a first focal length L1. In region R2, the ridges and grooves are spaced so that region R2 exhibits a second focal length L2. Similarly, in region R3, the ridges and grooves are spaced so that region R3 exhibits a third focal length L3, and so forth. As a result of this novel structure, if media 30 wobbles, the different regions R1 to Rn ensure that regardless of such wobbling, laser light will continue to be focussed on a small spot on media 30.

In one embodiment, there are discrete breaks between the focal length of regions R1 to Rn. In other words, there is an abrupt discontinuity in the spacing of the ridges and grooves in region R1 compared to region R2. Similarly, there is an abrupt discontinuity in the spacing of the ridges and grooves in region R2 compared to region R3, and so forth. These discontinuities are typically of very low magnitude. In another embodiment, the spacing of the grooves and ridges in the lens can vary continuously from region R1 to Rn. Furthermore, the variation from R1 to Rn can be reversed in order to periodically vary from the spacing of region R1 to the spacing of region Rn and then again to R1. This periodic variation can be carried out once, or a number of times through the entire lens aperture. Two periods are depicted in FIG. 3.

FIGS. 4 and 5A illustrate in plan view and perspective view, respectively, an example of such a lens. In FIG. 4, as one proceeds in a circumferential direction around lens 32, the ridges and grooves move inwardly (towards the center of the lens) and outwardly (away from the center of the lens). Those portions of lens 32 in which the grooves and ridges are closer to the center of the lens exhibit a smaller focal length, whereas those portions of lens 32 in which the grooves and ridges are further from the center of lens 32 exhibit a larger focal length. The net result of this unique structure is that if the lens is used in conjunction with recording media that wobbles, lens 32 can continue to focus laser light onto a small spot on the media.

FIG. 4 also shows that a centrally located portion 34 of lens 32 is opaque and occluded. This causes a reduction in the laser spot size provided by the lens, for reasons discussed in the above incorporated '608 application.

The pattern of ridges and grooves are typically formed by applying a mask on a transparent substrate, patterning the mask to form the pattern of ridges and grooves in the mask, and transferring that pattern of ridges and grooves from the mask into the substrate. Details concerning such a manufacturing process are described in the above-mentioned '608 and WO 98/52101 applications As mentioned above, a lens in accordance with our invention can be formed in several ways. For example, instead of being formed with a blazed zone plate, e.g. as shown in FIG. 5A (see also FIGS. 4 and 4A), the lens can be formed as a binary zone plate or a multilevel phase relief zone plate, e.g. as shown in FIG. 5B (a binary version having two phase levels) and FIG. 5C (a quaternary version, or four phase levels). Referring to FIG. 5B, lens 100 comprises alternating recessed and non-recessed regions 102 and 104 formed in a transparent substrate 106. These alternating recessed and non-recessed regions form a lens as described in the above-incorporated '608 application. However, the lateral spacing of these recessed and non-recessed regions varies as one proceeds about the circumferential direction of the lens. Because of this, different portions of lens 100 exhibit different focal lengths. The focal length of lens 100 varies continuously and smoothly (here 8 times for one circumferential revolution). In another embodiment, the variation of focal length can take discrete jumps instead of continuously increasing or decreasing, and thus produce abrupt phase discontinuities as one moves around the lens in the circumferential direction.

FIG. 5C is similar to FIG. 5B except that lens 100' of FIG. 5C comprises regions having four phase levels (i.e. alternating bands of four different heights). These phase levels also form a diffractive lens. However, the lateral spacing of these phase levels varies as one proceeds about the circumferential direction of the lens. Because of this, different portions of lens 100' exhibit different focal lengths in the same manner as the lens of FIG. 5B. As with lens 100 of FIG. 5B, the focal length of lens 100' of FIG. 5C varies continuously and smoothly. However, in another embodiment, the variation of focal length can be abrupt as well.

The lenses of FIGS. 5B and 5C function because light striking the regions of different heights (or depths) emerge from the lens at different phases. The light from the different regions forms an interference pattern that effectively focuses light onto a small spot on data recording media.

The lenses of FIGS. 5B and 5C can be manufactured by applying a mask to a transparent substrate, patterning the mask to expose portions of the substrate, and etching the exposed portions of the substrate. The mask is then removed, leaving a set of etched (recessed) and non-etched (unrecessed) regions. (See the '608 and '778 applications.) In the case of FIG. 5C, several masking and etching steps are required.

In an alternate embodiment, instead of altering the phase of light emerging from the lens by etching recessed regions into substrate 106, the phase of the light emerging from the different portions of the lens can be modified by diffusing a dopant into portions of the substrate to locally increase the refractive index at those portions of the substrate. An example of such a lens is lens 150 of FIG. 6.

Referring to FIG. 6, lens 150 comprises regions 152 and 154 in a transparent substrate 156. Regions 152 comprise intrinsic substrate material, i.e. substrate material that is not doped. However, regions 154 comprise substrate material that has been doped with an impurity that locally increases the refractive index of the substrate material. Therefore, instead of achieving phase modulation of the light emerging from the lens by forming a relief pattern in the substrate as shown in FIGS. 5B and 5C, in FIG. 6, this phase modulation is achieved by doping portions of the transparent substrate. In one embodiment, the substrate is formed from glass, and the dopants used to achieve this effect are a silver-containing material, e.g. silver or a salt such as silver nitrate.

FIGS. 7A to 7C illustrate the manner in which lens 150 can be manufactured. In particular, in FIG. 7A, transparent glass substrate 156 is covered with a layer of e-beam resist 158. E-beam resist layer 158 is patterned in a conventional manner by subjecting resist 158 to an e-beam and then developing the resist, thereby exposing portions of substrate 156. Dopants are then introduced into the exposed portions of substrate 156, e.g. by ion implantation, to locally modify the refractive index at portions 154 of substrate 156 (FIG. 7B). E-beam resist layer 158 is then removed (FIG. 7C).

In an alternative embodiment, a Cr layer is sputtered onto substrate 156 before depositing e-beam resist layer 158. After e-beam resist layer 158 is patterned, the pattern in e-beam resist layer 158 is transferred to the Cr layer. The Cr layer serves as a mask during the above-mentioned ion implantation step. After ion implantation, the Cr layer and e-beam resist layer 158 are both removed. (In lieu of Cr, other masking materials can be used as well.)

In yet another embodiment, the silver-containing dopant can be introduced into substrate 156 using a method other than ion implantation. For example, in one embodiment, substrate 156 (along with a patterned mask formed thereon) can be immersed in a heated bath containing a silver salt, such as silver nitrate. Silver can diffuse into the exposed portions of the substrate from the bath to locally increase the refractive index of the substrate. The bath can be under pressure in this embodiment.

FIGS. 8A and 8B illustrate a diffractive lens 160 constructed in accordance with another embodiment of our invention comprising alternating transparent and opaque regions 162 and 164. (Opaque regions 164 of lens 160 are formed by depositing an opaque material such as Cr on a transparent substrate 166 and lithographically patterning the Cr so that the Cr covers regions 164.) Of importance, regions 162 and 164 form a diffraction pattern that causes lens 160 to focus light onto a small spot. However, the spacing of regions 162 and 164 increases and decreases as one proceeds circumferentially around lens 160. Thus, different regions of lens 160 exhibit different focal lengths. Lenses comprising alternating opaque and transparent regions are described in more detail in the above-incorporated '608 application.

FIG. 9 represents a numerical reconstruction of the focal spot in a plane along the optical axis of a lens. A collimated laser beam 71 is diffracted by lens 72 and focused into a spot 73 onto recording media 74. The lens considered in FIG. 9 is a simple Fresnel lens 72. The depth of focus is short, and thus wobbling of the media 74 can only occur with small amplitude along the arrow A1, or the lens will no longer provide a small spot on the media.

FIG. 10 represents a numerical construction of the focal spot in a plane along the optical axis for a lens 82 constructed in accordance with the above mentioned PCT Patent Application WO 98/52101. Referring to FIG. 10, the depth of focus of the resulting spot 83 is somewhat increased compared to FIG. 9, allowing the media 74 to wobble within a greater range along arrow A2.

In FIG. 11, lens 92 has been constructed in accordance with our invention, and produces a spot 93 with extended focal depth, thus allowing media 74 to wobble along arrow A3 without adversely affecting the reading/writing performance of the disk drive. The focal length variation in the last case (FIG. 11) is of about 0.5%, thus enjoying a focal depth of about 7 microns for a mean focal length of 1500 microns. The focal length variation should not be increased too much since this would result in both a dramatic intensity drop at the recording media, and creation of successive spots along the optical axis.

In one embodiment, the lens provides a spot of laser light having a diameter of less than about 0.5 microns, and preferably between 0.25 and 0.45 microns. However, other spot sizes can be used in accordance with our invention.

The lens can be used in conjunction with different kind of lasers. In one embodiment, laser light having a wavelength of 650 nm is used. Alternatively, a laser diode having a wavelength of 405 or 407 nm can be used. (As explained in the above incorporated PCT and '608 applications, if a diffractive lens is used in conjunction with our invention, the spacing of the various ridges and grooves, recessed and non-recessed regions, or opaque and transparent regions depends upon the wavelength of the laser light.)

As is known in the art, laser wavelengths produced by a diode laser can vary over a given range. Since the focal length of a diffractive lens is a function of the laser wavelength, the variation of focal length of different portions of the lens allows the diffractive lens to accommodate such variation in laser wavelength without losing the ability to provide a small focused spot of laser light on the media.

We have now explained how one can increase the focal depth of a single focal spot, and how the phase function of a diffractive lens can be defined by forming appropriately spaced ridges and grooves, recessed and non-recessed regions, opaque and transparent regions, or regions of different refractive indices.

In another embodiment of our invention, an optical compound lens produces not only one spot, but two or more focal spots in order to be able to read and write over several different disk media types which may have different substrate thicknesses.

FIG. 12 shows how a compound lens 180 can receive a laser beam 181 and generate two separate spots S1, S2 from beam 181. Spots S1, S2 can be used to read from and write to optical or magneto-optic media, e.g. disks 182, 183, with substrates 184, 186 of different thicknesses. T1, T2 over recording layers 188, 190 respectively. Lens 180 compensates for two different spherical aberrations associated with substrates 184, 186. (Spherical aberration occurs when converging light from a lens passes through a planar structure such as the substrates of disks 182, 183. Thus, there is a certain amount of spherical aberration associated with each of the substrates on disks 182, 183.) Lens 180 of FIG. 12 uses spatial multiplexing of two separate lens functions that have been calculated individually. In other words, the gratings on one portion of lens 180 compensate for the spherical aberration for substrate thickness T1, while the gratings on the other portion of lens 180 compensate for the spherical aberration for the other substrate thickness T2. Both of these lens functions can use the previously described technique to increase the depth of focus of each spot individually.

In one embodiment a computer software package can be used to calculate the position of the gratings. One such package is called Code V, available from Optical Research Associates in Pasadena, Calif. Code V can be used to optimize the lens aspherical phase function. Another software package is DOE-CAD, available from Diffractive Solutions of Strasbourg, France. DOE-CAD can be used to calculate the position of the gratings and generate an e-beam lithography file for lens fabrication.

(It should be noted that as used herein, the term "gratings" includes diffraction structures that are curved, circular, or have other shapes.)

Several different geometries can be used in order to spatially multiplex the two different lens functions. The doughnut shaped aperture geometry 201 in FIG. 13 can handle both a small NA lens 202 within a central region and a high NA lens 203 in an outer region. Small NA lens 202 can be used in order to accommodate a thick overcoat 205 and the high NA lens 203 can be used to accommodate a thin overcoat 204. Thus, the combination of the two lenses within a single circular aperture produces a compound lens (or dual lens) that can focus a single collimated, diverging or converging beam 210 into two aberration-free spots 206 and 207 on recording media through two different overcoat thickness 204 and 205. Of importance, the spacing of the ridges and grooves of lenses 202, 203 (for the case of a blazed lens) can vary to increase the depth of focus for each of these lenses. (For the case in which lenses 202, 203 are phase or zone lenses, the recesses or opaque regions can likewise be varied to increase the depth of focus for these lenses.) Lenses 202, 203 are formed on a single transparent substrate (typically simultaneously) using a manufacturing process as described above.

Of importance, if the structure of FIG. 13 is used in conjunction with recording media having a relatively thick substrate, the focal spot of lens 202 is located above and sufficiently far from the media recording layer so as to not interfere with reading and writing to the recording layer. Similarly, if the structure of FIG. 13 is used in conjunction with recording media having a relatively thin substrate, the focal spot of lens 203 will be below and sufficiently far from the media recording layer so as to not interfere with reading and writing to the recording layer.

FIG. 14 shows another geometry 301 of spatial multiplexing for two lenses that resembles a pie chart, where different sectors of a central pie chart have a low NA lens function 302 and the interleaved sectors and the external portion have a high NA lens function 303. The compound lens operation is similar to the one described in FIG. 13. This geometry has however the advantage of reducing the side lobes of the high NA spot which is caused by the corresponding doughnut shaped lens described in FIG. 13. (These side lobes are undesired areas of illumination provided by the lens near the lens focal spot.) In this case both high NA and low NA use all the spatial frequencies in the radial direction to produce aberration-free spots 306 and 307.

The term "spatial frequencies" refers to the spacing of the gratings (e.g., ridges and grooves) of the diffractive lens. Closely spaced gratings have a high spatial frequency, i.e. a high number of gratings per unit length. Distantly spaced gratings have a low spatial frequency. For optimal focusing of a spot, it is desirable to use most (or, preferably all) of the spatial frequencies of the grating. The angle of the gratings also varies over the surface of the lens. It is also desirable to use most (or preferably all) of the angular positions of the gratings as well to diffract the laser light wavefront into a focal spot. In the pie chart embodiment, (FIG. 14), all spatial frequencies contribute to both the focal spots, but not all the angular positions. In the dart board embodiment (FIG. 15, described below), all of the spatial frequencies as well as the angular positions of the gratings contribute to both focal spots.

Another geometry that can be used for spatially multiplexing two different lenses into a circular aperture resembles a dart board geometry 401 in FIG. 15. Again, the compound lens operation is similar to the one described in FIG. 13 and FIG. 14. However, this geometry has the advantage of not only reducing the side lobes of the high NA spot 406, but also reducing the asymmetry and increasing the Strehl ratio of that same spot 406 by using all the spatial frequencies in the radial and in the circumferential directions, for both high NA and low NA lenses. In this case the lenses 402 and 403 are not only interleaved in the circumferential direction as in the pie chart case, but also in the radial direction. The performance increase of the high NA lens producing spot 406 does not decrease the performance of the low NA lens producing spot 407.

An example of spatial multiplexing in a dart board geometry of two different lenses calculated to produce two aberration-free spots through two different substrate thicknesses is shown in FIG. 16A for the low NA lens 401, and in FIG. 16B for the high NA lens 402. Very low focal length variation has also been introduced within both lenses in order to produce extended depth of focus within each focal spot as described above. As a result, a lens in accordance with our invention can read from and write to two or more disk media with various substrate thicknesses, and at the same time allow wobbling of the disk media much more than with prior art lenses.

While FIGS. 13 to 15 show a compound lens with two regions having two different focal lengths, other embodiments of the invention can have more than two regions having more than two different focal lengths. These regions are typically formed on a common transparent substrate as described above.

While the invention has been described with respect to specific embodiments, those skilled in the art will recognize that changes can be made in form and detail without departing from the spirit and scope of the invention. For example, the single or compound lens can be used in applications other than magneto-optic or optical disk drives. The lens can be refractive, diffractive or graded-index. Also, although the focal length can vary as one proceeds circumferentially about the lens, in other embodiments the focal length can change as one moves radially about the lens. Further, the position of the lens having small focal length variations can be arranged in other ways as well. Similarly, spatial multiplexing of two or more lenses within a single aperture, can be performed in numerous ways, and is not constrained to doughnut, pie chart and dartboard geometries. Also, the overall aperture of the compound lens can have shapes other than circular. A disk drive incorporating a lens in accordance with our invention can focus light from a single laser source or two different laser sources with different wavelengths. It is known in the art that there are different types of disks designed for lasers of different wavelengths. For example, some optical media are designed for use with a 650 nm wavelength laser beam whereas other media are designed for use with a 780 nm wavelength laser beam. In one embodiment, a compound lens in accordance with our invention comprises a first region for accommodating the first type of media and a 650 nm laser, and a second region for accommodating the second type of media and a 780 nm laser. An optical drive employing a lens in accordance with our invention can contain both a 650 nm laser and a 780 nm laser. (Accommodating the first and second types of media also includes being able to accommodate the overcoat thicknesses associated with each type of media.) The laser sources could be switched on or off, depending upon which type of media is inserted into the drive. Alternatively, a shutter or filter could block one laser or the other, depending upon which type of media is inserted into the disk drive.

While the embodiments of FIGS. 13 to 15 comprise relatively low and high NA (numerical aperture) regions, these regions need not have different NAs. The regions in the embodiments of FIGS. 13 to 15 need only have different optical design characteristics so as to accommodate different substrate thicknesses or laser wavelengths.

The lens can be used in conjunction with media manufactured with different techniques. For example, the transparent layer over the recording layer is typically the substrate on which the recording layer is deposited. However, the transparent layer over the recording layer can be transparent material deposited on the recording layer as well. In addition, the lens of the present invention can be used in conjunction with a disk lacking a transparent layer.

In one embodiment, a lens in accordance with our invention produces one spot with extended depth of focus. In another embodiment, the lens produces a plurality of spots without extended depth of focus. In yet another embodiment, the lens produces one or more spots with extended depth of focus, and one or more spots without extended depth of focus.

While the lens is used in the above-described embodiments in conjunction with data storage media, our lens can be used in conjunction with other applications as well, e.g. any time it is desirable to focus a beam of light, such as a laser, on any workpiece that moves toward or away from the lens, or any other application requiring extended depth of focus. The lens can also be used in any application in which it is desired to provide more than one focal spots from one incoming light beam. (The spots can be displaced from one another either in the direction of the optical axis or in a direction perpendicular to the optical axis.) Accordingly, all such changes come within our invention.

We claim:

1. A lens for focussing light, said lens comprising a surface area, different regions of said surface area having different focal lengths such that said lens produces an extended depth of focus, wherein said lens focuses laser light onto data recording media.

2. A lens for focussing light, said lens comprising a surface area, different regions of said surface area having different focal lengths such that said lens produces an extended depth of focus, wherein said lens is a diffractive lens.

3. Lens of claim 2 wherein said lens is a blazed zone plate lens, said blazed zone plate lens comprising a set of ridges and grooves, the spacing of which determines the focal length of said lens, the spacing of said ridges and grooves varying so that different regions of said surface area have said different focal lengths.

4. Lens of claim 2 wherein said lens is a phase zone plate lens, said phase zone plate lens comprising a set of recessed and non-recessed regions, the spacing of which determines the focal length of said lens, the spacing of said recessed and non-recessed regions varying so that different regions of said surface area have different focal lengths.

5. Lens of claim 2 wherein said lens is a zone plate, said zone plate comprising a set of opaque and transparent regions, the spacing of which determines the focal length of said lens, the spacing of said opaque and transparent regions varying so that different regions of said surface area have different focal lengths.

6. Lens of claim 2 wherein said lens is a graded-index lens.

7. Lens of claim 2 wherein the focal length of the different portions of said surface area of said lens varies less than 10%.

8. The lens of claim 2 wherein the focal length of different portions of said surface area of said lens varies less than 2%.

9. The lens of claim 2 wherein the focal length of the different portions of said surface area of said lens varies by more than 0.1%.

10. Lens of claim 2 wherein said depth of focus is extended along a range of distances from said lens.

11. Lens of claim 2 wherein said lens produces a plurality of focal spots, and said different regions of said surface area cooperate to cause said focal spots to exhibit an extended depth of focus.

12. Apparatus comprising:
   a source of light;
   a data recording medium; and
   a lens for focussing light from said source of light onto said recording medium, different portions of said lens exhibiting different focal lengths so that if said recording medium moves toward or away from said lens, said lens continues to focus said light onto said data recording medium.

13. Apparatus of claim 12 further comprising a motor for rotating said data recording medium.

14. Apparatus of claim 13 wherein the focal length of said lens varies by more than 0.1% and less than 10%.

15. Apparatus of claim 12 wherein said source of light is a diode laser providing a laser beam.

16. A method comprising the steps of:
providing light through a lens so that said lens focuses said light on a data recording medium; and
rotating said data recording medium, said lens comprising regions characterized by different focal lengths so that if said data recording medium is displaced towards or away from said lens, said lens continues to focus onto a small spot on said data recording medium.

17. A lens comprising a first region and a second region, said first region exhibiting a first optical design, said second region exhibiting a second optical design, so that said lens can be used in conjunction with at least two different types of recording media having two different layer thicknesses over the media recording layer.

18. Lens of claim 17 wherein said lens is a diffractive lens.

19. Lens of claim 17 wherein said first region exhibits a first focal length and said second region exhibits a second focal length.

20. Lens of claim 17 wherein said first region accommodates a first spherical aberration correction and said second region accommodates a second spherical aberration correction.

21. Lens of claim 17 wherein said layer thicknesses are substrate thicknesses.

22. Method for focusing a light on a first recording medium, said first recording medium having a first recording layer and first material over said first recording layer, said method comprising the step of focusing light through a lens, said lens comprising first and second regions, said first region exhibiting a first focal length, said second region exhibiting a second focal length, whereby said lens uses said first region to focus light on said first recording layer within said first recording medium and whereby said lens can use said second region to focus light on a second recording layer within a second recording medium comprising material over said second recording layer having a thickness that is different from the thickness of said first material.

23. Method of claim 22 further comprising the steps of:
replacing said first medium with said second medium; and
focusing light through said lens onto said second medium, said lens using said second region to focus light on said second recording medium.

24. Method of claim 22 wherein said second region focuses light sufficiently distant from said recording layer of said first recording medium so as to not interfere with reading data from said recording layer.

25. Apparatus comprising:
a first source of a laser beam having a first wavelength;
a second source of a laser beam having a second wavelength different from said first wavelength; and
a lens comprising first and second regions, said lens receiving said first and second laser beams, said first region of said lens focusing said first laser beam on a first spot, said second region of said lens focusing said second laser beam on a second spot.

26. Apparatus of claim 25 wherein said lens selectively receives either said first or said second laser beam.

27. Apparatus of claim 25 wherein said apparatus is a data storage drive for receiving recording media adapted for use with one of said two laser beams, whereby said lens can be used in conjunction with recording media for use with said first laser beam and said lens can be used in conjunction with recording media adapted for use with said second laser beam.

28. Method comprising the steps of:
providing a first laser beam having a first wavelength, said first laser beam going through a lens, said lens having at least a first region for focusing light of said first wavelength at a first focal spot and a second region for focusing light of a second wavelength at a second focal spot, said second wavelength being different from said first wavelength.

29. Method of claim 28 further comprising the steps of:
providing first data recording media having a data recording layer therein; and
using said lens to focus said first laser beam on said data recording layer.

30. Method of claim 28 further comprising the steps of:
removing said first data recording media and providing a second data recording media having a data recording layer therein; and
using said lens to focus said second laser beam on said data recording layer within said second data recording media.

31. A lens for focusing light, said lens comprising a surface area, different regions of said surface area having different focal lengths, wherein said lens focuses light into a focal spot and said different regions of said lens cooperate to extend the length of said focal spot over a range of distances from said lens, wherein the depth of focus of said lens is greater than $0.8\lambda/(NA)^2$.

32. Lens of claim 31 wherein said different regions of said lens cooperate such that said lens creates a substantially circular focal spot as seen in a plane perpendicular to the optical axis of said lens over an extended range of distances from said lens.

33. A lens for focusing light, said lens comprising a surface area, different regions of said surface area having different focal lengths, wherein said lens focuses light into a focal spot and said different regions of said lens cooperate to extend the length of said focal spot over a range of distances from said lens, wherein said different regions of said lens cooperate such that said lens creates a substantially circular focal spot as seen in a plane perpendicular to the optical axis of said lens over an extended range of distances from said lens, wherein the spot size of said lens is less than about 0.5 microns along said extended range of distances.

34. Lens of claim 33 wherein the depth of focus of said lens is at least about 7 microns.

35. Lens of claim 33 wherein the depth of focus of said lens is at least about 0.5% of the focal length of said lens.

36. Lens of claim 33 wherein the focal characteristics of the different regions of said lens gradually change across the surface of said lens.

37. Lens of claim 33 wherein the focal characteristics of the lens vary as a function of the circumferential position on the lens surface.

38. Lens of claim 33 wherein the focal characteristics of the lens vary as a function of the radial position on the lens surface.

39. Lens of claim 33 wherein the focal characteristics of the lens vary as a function of both the radial and circumferential position on the lens surface.

40. Lens of claim 33 wherein the depth of focus of said lens is extended in a direction substantially parallel to the optical axis of said lens.

41. Lens of claim 33 wherein said lens produces a plurality of focal spots, and said different regions of said surface area cooperate to cause said focal spots to exhibit an extended depth of focus.

42. Method comprising applying light through a lens, said lens comprising a surface area, different regions of said surface area having different focal lengths such that said regions cooperate to produce a focal region of light having an extended depth of focus, wherein the focal spot size of said lens is less than about 0.5 microns.

43. Method of claim 42 wherein said lens focuses said light onto a spot, said different regions of said lens extending the length said spot extends along the optical axis of said lens.

44. Method of claim 42 wherein said different regions of said lens cooperate such that said lens creates a substantially circular focal spot over an extended range of distances from said lens.

45. Method of claim 42 wherein the depth of focus of said lens is at least about 7 microns.

46. Method of claim 45 wherein the depth of focus of said lens is at least about 0.5% of the focal length of said lens.

47. Method of claim 42 wherein the focal characteristics of the different regions of said lens gradually change across the surface of said lens.

48. Method of claim 42 wherein said lens produces a plurality of focal spots having an extended depth of focus.

49. Method comprising applying light through a lens, said lens comprising a surface area, different regions of said surface area having different focal lengths such that said regions cooperate to produce a focal region of light having an extended depth of focus, wherein the depth of focus of said lens is greater than $0.8\lambda/(NA)^2$.

* * * * *